Nov. 24, 1925. Re. 16,214

A. H. STURGES

FUEL SAVING DEVICE

Original Filed March 24, 1924 3 Sheets-Sheet 1

Inventor
A.H. Sturges,

By Mawhinney & Mawhinney
Attorneys.

Nov. 24, 1925.
Re. 16,214
A. H. STURGES
FUEL SAVING DEVICE
Original Filed March 24, 1924 3 Sheets-Sheet 2
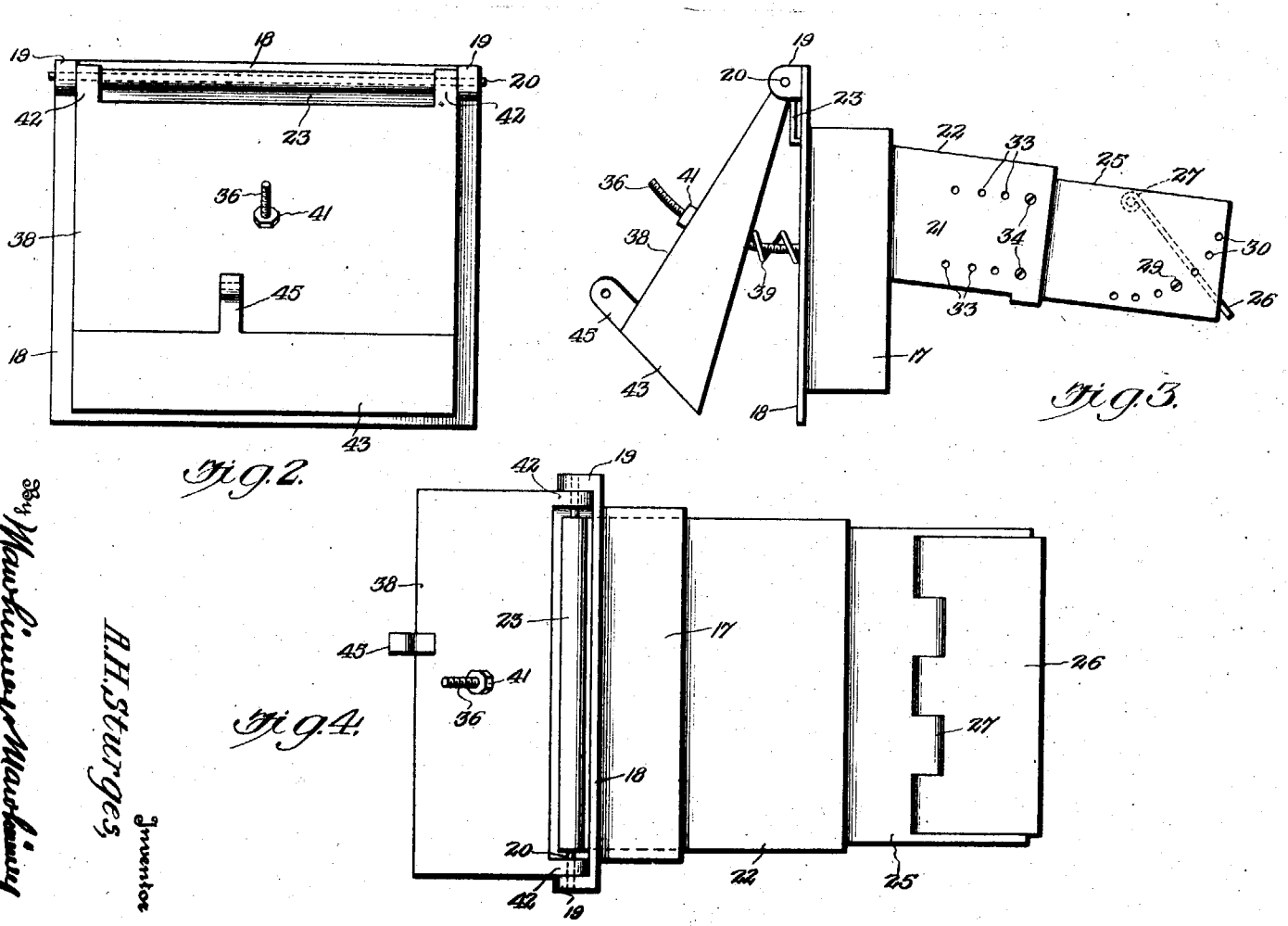
Inventor
A. H. Sturges,
By Mawhinney & Mawhinney
Attorneys Nov. 24, 1925. Re. 16,214
A. H. STURGES
FUEL SAVING DEVICE
Original Filed March 24, 1924 3 Sheets-Sheet 3
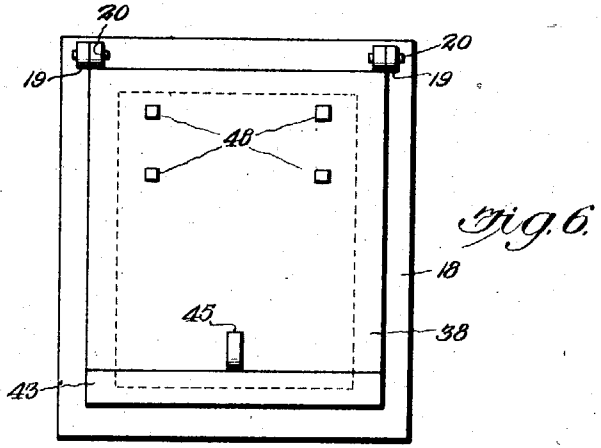
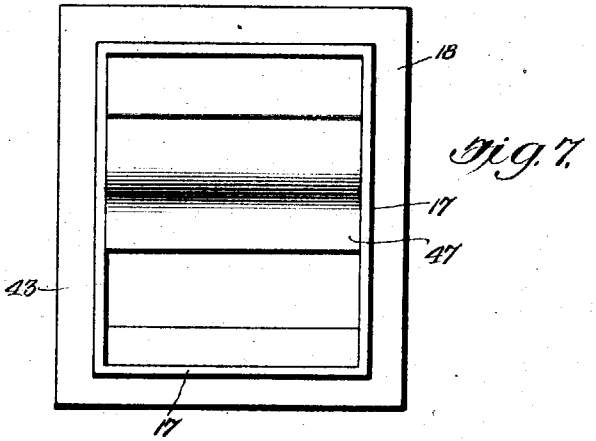
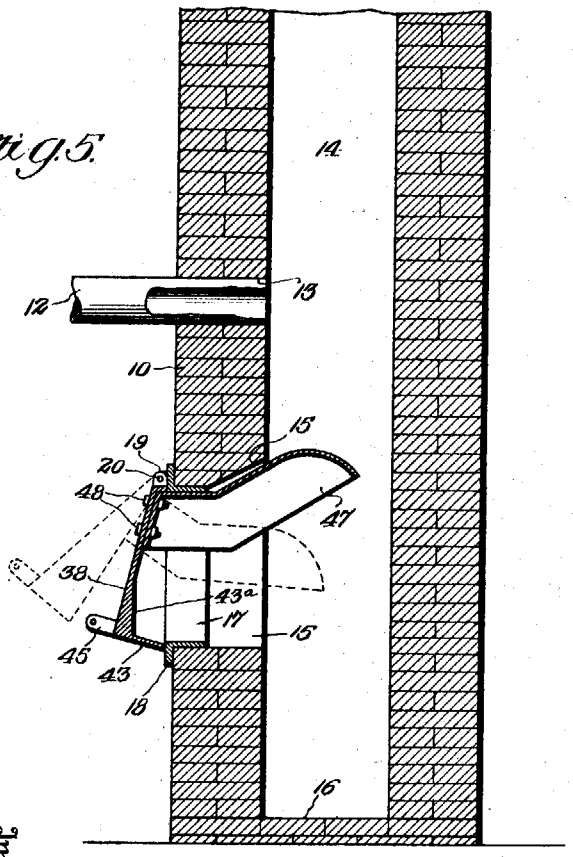
Inventor
A. H. Sturges,
By Mawhinney & Mawhinney
Attorneys Reissued Nov. 24, 1925. Re. 16,214

UNITED STATES PATENT OFFICE.

ARTHUR H. STURGES, OF OMAHA, NEBRASKA.

FUEL-SAVING DEVICE.

Original No. 1,503,887, dated July 29, 1924, Serial No. 701,593, filed March 24, 1924. Application for reissue filed February 18, 1925. Serial No. 10,156.

*To all whom it may concern:*

Be it known that ARTHUR H. STURGES, a citizen of the United States, residing at Omaha, in the county of Douglas and State of Nebraska, has invented certain new and useful Improvements in Fuel-Saving Devices, of which the following is a specification.

This invention relates to fuel saving devices, and more particularly to that class of devices which may be installed in chimneys or smoke stacks.

An object of this invention is to provide a device which will increase the efficiency and economy of heating devices, particularly furnaces, stoves, and the like.

Another object of the invention is to provide a durable collapsible device which upon installation may be adjusted to meet the peculiar conditions encountered with each furnace, chimney or the like.

A further object is to provide a mixing chamber in the chimney flue below the smoke pipe, and to provide a deflector between said smoke pipe and mixing chamber for directing a draft of air from the atmosphere to sweep downwardly below the deflector into said mixing chamber irrespective of the size of the chimney.

A still further object of the invention is to provide an anchorage or support for the deflector which will so position the deflector in a chimney near or in a draft opening that the deflector may be adjusted to direct the air current downwardly of the chimney flue into the mixing chamber at the desired angle, depending upon the particular draft conditions.

The above and various other objects and advantages of this invention will in part be described in, and in part be understood from the following detailed description of the present preferred embodiment, the same being illustrated in the accompanying drawings, wherein:

Figure 2 is a front elevation of the fuel saving device.

Figure 3 is a side elevation of the same.

Figure 4 is a top plan view thereof.

Figure 5 is a longitudinal section of a modified form of the device installed in a chimney, a portion of the latter being shown in section.

Figure 6 is a front elevation of the modified form, and

Figure 7 is a rear elevation of the modified form.

Figure 1:
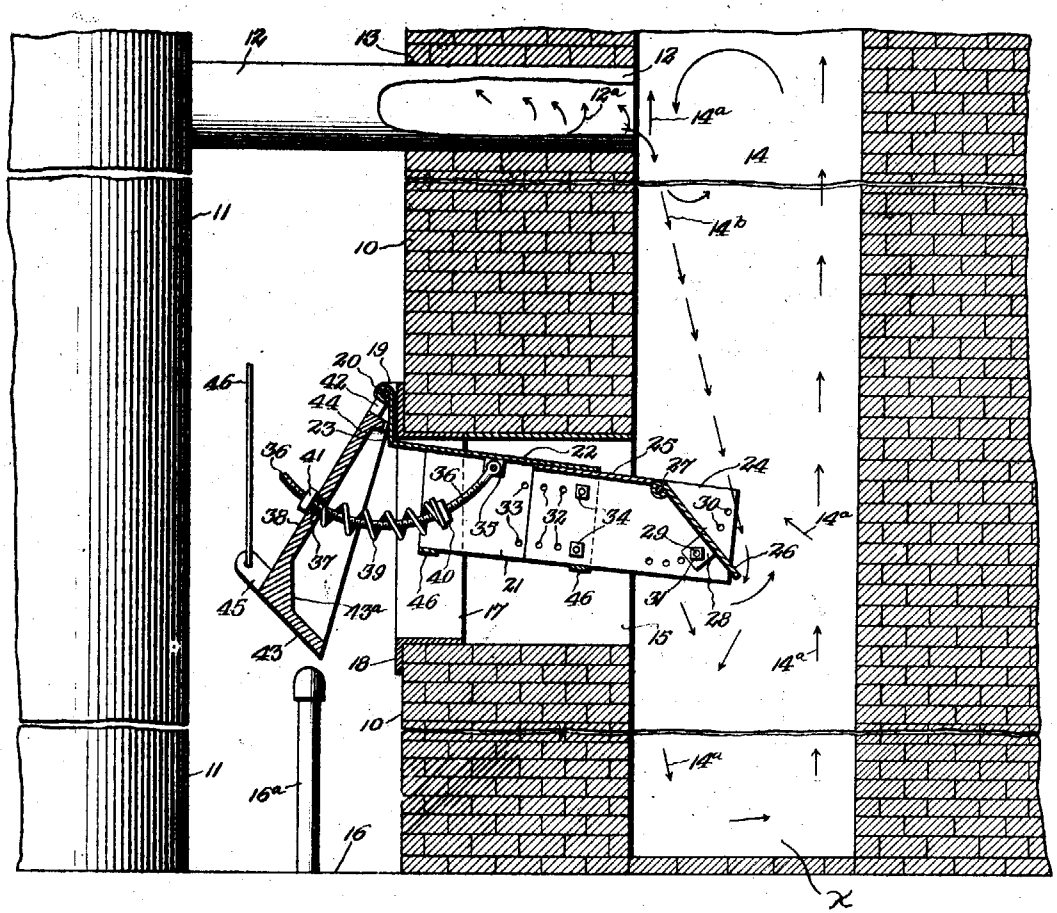
Figure 1 is a longitudinal section of a fuel saving device constructed according to the present invention, which is installed in a chimney, a fragmentary view of the chimney and heating plant being shown in section.

Referring to the drawings, and first to Figures 1 to 4, numeral 10 designates a chimney of the usual type adapted for carrying away smoke and gases from the heating plant 11 which may be of the type used for generating steam, hot-water or the like. The gases and smoke from the heating plant 11 are carried through a smoke pipe 12 which enters a suitable opening 13 in one side of the chimney 10, and from thence the gases and smoke are carried into the atmosphere by the flue 14. It is of course understood that the chimney 10 with the flue 14 may be of any desired height and may be made of brick, stone or the like and that the flue formed by the chimney may be of any desired shape. The cross sectional area of the chimney flue is considerably greater than that of the conducting smoke pipe 12 to permit free expansion of the furnace gases and also to permit a greater degree of control of the draft by the present invention. The chimney 10 has a second opening 15 which is cut through one side of the chimney below the smoke pipe and sufficiently near to the opening 13 to provide a mixing chamber $x$ below the second opening; and within this second opening is mounted a suitable support or frame 17. When the support 17 is in the form of a frame as shown, it may fit snugly into the opening 15 and may be cemented or otherwise secured in place. To further prevent the frame 17 from becoming loose, and for purposes hereinafter described, a flange 18 is provided on the outer edge of said frame which fits flush against the inner wall of the chimney 10. The upper edge of the flange 18 is provided with a plurality of lugs 19 which are in spaced apart relation to each other and serve as bearings for a rod 20.

The support 17 provides an anchorage or retainer for the rod or pivot 20 to which the deflector may be hinged. The opening 15 is an air draft opening for the chimney 10 and communicates with the flue 14 at a point immediately above the chamber $x$ below the smoke pipe 12 but in sufficient proximity to said pipe to affect the draft of smoke and furnace gases which pass from said pipe into the flue 14 as will presently be described. A draft or air deflecting member is associated with the draft opening 15, in the top thereof or at or in the end of the draft opening 15, one example of all of which is shown in Figure 1 of the drawings, to direct the air entering through the opening 15 downwardly into the chamber $x$. The present drawings show an air deflector having side members 21 and a top member 22 which is loosely fitted into the frame 17, and at its outer end the top member 22 is provided with a flange 23 which substantially encircles the rod 20 intermediate its ends and intermediate the lugs 19, thus forming a hinge to permit the deflector to be swung to any desired angle. The flange 23 is relatively long, and is of sufficient length to extend upwardly over the front face of the flange 18 to the rod 20 and extends downwardly to support the deflector 21, 22 within the opening 15 of the chimney. A second air deflector member is provided having side members 24 and a top member 25 the inner end of the latter member terminating at a point intermediate the ends of said side members 24. A third deflector member 26 has its upper edge rolled over to form a hinge engaging a rod 27 which is secured in the side members 24 near the inner extremity of the top wall 25. Adjacent the lower edge of the deflector member 26 and on the under side thereof is provided a plurality of lugs 28 which are in spaced apart relation to each other. A rod 29 is selectively seated at opposite ends in corresponding openings 30 of opposed series of the openings arranged in arcuate rows concentric to the first rod 27 in the side members 24 near their inner ends, and the rod 29 also passes through the lugs for securely holding the deflector member 26 in a predetermined position. The rod 29 is preferably threaded at either or both ends to receive a nut 31 for securing the rod against movement. Adjacent the outer ends of the side members 24 and intermediate the upper and lower edges of said side members a series of holes 32 is provided in spaced apart relation to each other and preferably paralleled to both the upper and lower edges, said holes 32 registering with a like series of holes 33 adjacent the inner ends of the side members 21. A plurality of threaded rods 34 extend through the holes 32 and 33 for securely holding the side members 21 and 24 against movement. To further strengthen the first deflector member a plurality of braces 46 are attached to the lower edges of the side members 21 adjacent the inner and outer ends. Intermediate the ends of the upper member 22 and on the lower side thereof is provided a lug 35 for hingedly holding an arcuate threaded rod 36 which extends outwardly and upwardly through an opening 37 on a door 38. An expanding spring 39 substantially encircling the rod 36 intermediate its ends is held at its inner end by an adjustable cup-shaped nut 40. The outer end of the spring 39 is free and is adapted to engage the inner wall of the door 38 to yieldingly support the door upon the air deflector 22 through the intermediary of the rod 36. Adjacent the outer end of the rod 36 there is provided an adjustable nut 41 for adjustably urging the door 38 against the spring 39. The upward and outward movement of the door 38 will take up the nut 41 with its rod 36 and permit the air deflectors to swing downwardly in the opening 15 of the chimney wall 10. The door 38 at its upper edge is provided with a plurality of lugs 42 which are hingedly secured to the rod 20, and at its inner edge is provided with a flange 43 which gradually increases in depth from the hinged top to the free lower end of the door 38 to abut the face of the panel 18 and maintain the door in a downwardly inclined position when shut, thus utilizing the full force of gravity on the door 38 for maintaining it closed. The flange 43 is further held in sealed position against the panel 18 by a weight $43^a$ which is formed at the deepest portion of the flange 43 by thickening the outer free edge of the door 38. The flange 43 at the upper edge of the door 38 has a recess at 44 to accommodate the flange 23 when the door is shut. The lower outer edge of the door 38 has a lug 45 for holding a chain 46 or the like so that the movement of the door may be controlled and operated at a distance therefrom. The fuel economizer of this invention may be installed in the chimney wall 10 at any suitable height above the floor or ground 16 by forming the opening 15 at the desired height above the ground to provide the mixing chamber $x$ above mentioned, said chamber extending from the opening 15 to the bottom of the flue 14, it being important that said opening 15 shall be in sufficiently close proximity to the pipe 12 to create a partial downward suction therefrom at the point where the pipe 12 opens into the flue 14, such as shown in Figure 1 and to accommodate the frame 17 and maintain the door 38 at all times above a steam pipe $16^a$ or any other device which may be disposed near the chimney wall 10.

The upward movement of the chain 46 raises the door 38 which simultaneously lowers the three deflecting members 22, 25 and 26 and permits the cold air to enter the opening 15. The air strikes the deflector, and particularly the innermost section 26 thereof, and is deflected downwardly into the chamber $x$ of the flue 14. This deflection of the air creates a partial vacuum beneath the inner end of the smoke pipe 12 and draws down a portion of the hot gases from the furnace as shown by the arrows $14^b$, which hot gases commingle and become mixed with the cold air from the draft opening 15 and are cooled thereby and are swept downwardly into the chamber $x$ and then upwardly, taking the path indicated by the arrows $14^a$, where they rise as a cooling draft to reduce the temperature of the chimney 10 and admix with and check, as is shown by the arrows $12^a$, the rise of the major portion of the hot gases issuing from the smoke pipe 12. This action insures the more thorough combustion of the products of combustion in the furnace before entering the chimney 10 and smoke pipe 12. Each deflector member may be adjusted to meet the varying conditions arising in each chimney both as to thickness of chimney or as to depth of flue.

In the modified form of this invention in Figures 5, 6 and 7 the deflector 47 is attached to the door 38 preferably by bolts 48 or the like. The deflector 47 is substantially L-shaped, the inner end of which has its top wall curved downwardly. In this modified form the arcuate rod 36 of the preferred form is dispensed with, and the upper inner edge of the opening 15 in the chimney 10 is flared sufficiently to permit the door to close tightly with the forward end of the deflector 47 substantially horizontal and the rear end thereof inclined upwardly as shown in Figure 5. This modified form is particularly adapted for use in chimney structures which are not of very great thickness, such as are found in the ordinary dwelling house.

The door 38 is of sufficient weight to swing downward when the chain 46 is released, and to lift the deflectors 22, 25 and 26 against the top of the opening 15 and to collapse the expanding spring 39 until the inner edge of the flange 43 on the door 38 strikes the panel 18, thus effectively sealing the opening 15. The sections 22 and 25 of the air deflector may be adjusted one upon the other to position the hinged deflector plate 26 the desired distance within the flue 14, and the deflector plate 26 may be secured at the required angle for causing the draft of air as shown by the arrows $14^b$ to sweep downwardly at the necessary angle to sweep across the bottom of the flue 14.

It has been ascertained that the provision of the chamber $x$ is necessary to permit the smoke and gases to become cooled. In operation, air moving through the opening 15 will be deflected downwardly into this chamber with considerable force, and the downward movement of smoke and unconsumed gases, caused by suction, as to their speed of movement and their volume, will obviously depend upon their expansion, and this expansion requires an adequate room or space.

It is well known that extreme heat of a chimney will cause increased draft from a furnace or the like and thereby will cause a large proportion of gases which have not been consumed to move into the chimney through the smoke pipe. The use of the present invention operates to thoroughly mix the smoke and gases with cold air to reduce their temperature and thereby reduce the temperature of the chimney walls, and therefore the device operates to save fuel.

It should be stated that, if the air-draft openings and deflectors are disposed in chimneys at the base thereof, similar to the conventional clean-out openings for soot, said openings would generally be too remote from the smoke-pipe to cause the required degree of suction necessary to operation, and such construction would not provide for a mixing chamber. Therefore in the present instance the opening is disposed near to the smoke pipe, the distance therefrom being determined by the area, in plan, of the flue 14.

It is of course understood that various changes and modifications may be made in the size, proportion and kind of materials used in the construction of this invention without departing from the spirit thereof, the scope of the invention being restricted only by the breadth of the following claims.

What is claimed is:—

1. In a fuel economizer, a frame adapted to be mounted in the wall of a chimney, a door hinged to the frame for regulating draft through the frame, and a deflector connected to the frame at a point spaced above the bottom thereof and projecting inwardly and downwardly through the frame, said deflector being adjustable simultaneously with the door as the latter is opened and closed.

2. A fuel device comprising a frame adapted for insertion in a chimney wall and having a panel secured to its outer edges, a hinged door for closing the opening within the frame, a deflector mounted in the upper part of the frame and having an open bottom and extending inwardly and downwardly from the frame, operating means for said deflector to actuate it simultaneously with the opening and closing of said door.

3. A fuel saving device comprising a frame adapted to be mounted in the wall of a chimney and having a panel on its outer edge, a hinged door for closing the opening within the frame, a deflector within said frame, connecting means between the door and deflector for simultaneously opening and closing the same, a second deflector adjustably attached to the first deflector, and a third deflector adjustably attached to said second deflector for movement therewith.

4. A fuel saving device comprising a frame adapted to be mounted in the wall of a chimney and having a panel on its outer edge, a hinged door having inwardly extending flanges on its inner surface adapted to seat against said panel, a hinged deflector within said frame, a second deflector adjustably attached to said first deflector, a third deflector contained within said second deflector for deflecting downwardly the draft of air entering through said frame, and an adjustable connection between the deflectors and the door for simultaneously adjusting the same.

5. In a fuel saving device, the combination of a chimney having a draft opening in its wall below the smoke pipe connection with the chimney, a support on the chimney, and a deflecting element pivoted on said support for adjustment in the path of air entering through said draft opening.

6. In a fuel saving device, the combination of a chimney having the usual smoke intake aperture and provided with a draft opening below said aperture, and a deflecting element pivotally mounted on the chimney for adjustment at various inclinations to the line of draft entering through said draft opening for deflecting the draft of air at the desired angle in the chimney.

7. In a fuel saving device, the combination of a chimney having the usual smoke pipe aperture and provided with a draft opening in one side spaced below but in cooperative proximity to said aperture, and a deflecting surface adjustably mounted at the top of said opening for deflecting a draft of air downwardly at the desired angle beneath the smoke pipe aperture to draw down a portion of the hot smoke and gases from said aperture for admixture with the air from the draft opening.

8. In a fuel saving device, the combination of a chimney having a draft opening in its wall below the smoke pipe connection with the chimney, and deflecting means arranged in the chimney between said draft opening and the smoke pipe connection for causing incoming air through the draft opening to move downwardly in the chimney and for drawing a proportion of the products of combustion from the smoke pipe into the draft of air.

9. A fuel saving device for application to chimneys comprising means for admitting a draft of air through the wall of the chimney at a point below the smoke pipe but in cooperative spaced relation therefrom, and deflecting means arranged between said draft supply means and the smoke pipe for directing a draft of incoming air downwardly toward the bottom of the chimney and for admixing a proportion of the products of combustion from the smoke pipe with the incoming draft of air.

10. In a fuel saver for a chimney having an opening for a smoke pipe, a second opening below the first named opening and a mixing chamber below the second opening, said openings and chamber being in communication with the chimney flue, a deflector fitted in the second opening for admitting air to the flue and directing it downwardly into the mixing chamber.

11. In a fuel saver for a chimney having a flue with a mixing chamber at its bottom and a smoke pipe connection spaced above the mixing chamber, a deflector mounted through the wall of the chimney and leading to the flue below said smoke pipe connection and inclined downwardly to direct a draft of cool air into the mixing chamber and create a down draft from the smoke pipe connection to draw smoke or unconsumed gases to said mixing chamber from the smoke pipe.

12. In a fuel saver for a chimney having a mixing chamber and a smoke pipe, a frame adapted to be fitted in an opening in the wall of the chimney between the mixing chamber and smoke pipe, and a deflector carried by the frame and extending downwardly and inwardly for deflecting a draft of cool air into said mixing chamber.

13. In a fuel saver for a chimney having an opening for a smoke pipe, a second opening below the first named opening, and a mixing chamber below the second opening, and an inclined deflecting-plate in the flue of the chimney in the horizontal plane of the second opening.

14. In a fuel saver for a chimney having a smoke pipe opening, a draft opening below said smoke pipe opening, a mixing chamber below the draft opening, and a deflecting member between the mixing chamber and said smoke pipe opening.

15. In a fuel saver for a chimney having an opening for a smoke pipe, a second opening below the first named opening, and a mixing chamber below the second opening, a frame adapted to be fitted in the second opening, and a deflector carried by the frame and extending downwardly and inwardly for deflecting a draft of cool air into said mixing chamber.

16. In a fuel saver for a chimney having an opening communicating with its flue, a second opening below the first named opening communicating with said flue, a mixing chamber below the plane of the second opening, a deflector member adapted to be disposed in said flue between the mixing chamber and first named opening, said deflector member being inclined inwardly and downwardly of the flue.

ARTHUR H. STURGES.